(12) United States Patent
Thompson et al.

(10) Patent No.: US 6,341,342 B1
(45) Date of Patent: *Jan. 22, 2002

(54) METHOD AND APPARATUS FOR ZEROING A TRANSFER BUFFER MEMORY AS A BACKGROUND TASK

(75) Inventors: Mark J. Thompson, Harris County, TX (US); Vincent J. Zimmer, King County, WA (US)

(73) Assignee: Compaq Information Technologies Group, L.P., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,862

(22) Filed: Nov. 4, 1997

(51) Int. Cl.[7] .............................................. G06F 9/312
(52) U.S. Cl. ........................................ 711/166; 707/206
(58) Field of Search ................................. 711/114, 147, 711/153, 154, 159, 111, 112, 4, 166, 155; 710/52; 707/205, 206, 170; 365/227

(56) References Cited

U.S. PATENT DOCUMENTS 5,404,511 A * 4/1995 Notarianni ..................... 707/1
5,734,861 A * 3/1998 Cohn et al. ................. 711/134
5,737,745 A * 4/1998 Matsumoto et al. ........ 711/114
5,875,456 A * 2/1999 Stallmo et al. ............. 711/114

* cited by examiner

Primary Examiner—B. James Peikari
(74) Attorney, Agent, or Firm—Akin, Gump, Strauss, Hauer & Feld, LLP

(57) ABSTRACT

An array controller that cleans buffer memory as a background task. The controller includes a transfer buffer, a memory that stores an index or table indicating free and non-zero data sectors within the transfer buffer, and processing logic that uses the transfer buffer for data transfer operations, and when otherwise idle, that scans the index table for contiguous sections of free and non-zero data sectors of the transfer buffer and that zeroes at least one of the contiguous sections. The controller allocates buffer memory and performs parallel logic operations into the buffer, such as XOR logic operations to generate new parity data. The buffer must first be zeroed or cleaned prior to the parallel operations. With the background task, the controller is more likely to find an appropriate size buffer of free and zeroed data sectors in the transfer buffer to perform the parallel logic operations. The background task significantly reduces or relieves the controller from having to issue CDB-based memory commands to zero or clean an allocated buffer during disk I/O operations.

13 Claims, 7 Drawing Sheets

METHOD AND APPARATUS FOR ZEROING A TRANSFER BUFFER MEMORY AS A BACKGROUND TASK

FIELD OF THE INVENTION

The present invention relates to drive arrays, and more particularly to a method and apparatus for zeroing transfer buffer memory as a background task to improve the performance of read and write operations to a drive array.

DESCRIPTION OF THE RELATED ART

Personal computer systems are continuing to develop at a relatively high pace due to substantial improvements in performance and density of semiconductor technology. The continual increase of computer system performance and use has lead to a corresponding need for improvements in the performance, capacity and reliability of secondary storage systems. Disk or drive arrays were proposed as an alternative to large and expensive magnetic disk drives. Several different levels of redundant arrays were introduced and analyzed in a landmark paper "A Case for Redundant Arrays of Inexpensive Disks (RAID)" by D. Patterson, G. Gibson and R. Katz, Report No. UCB/CSD 87/391, December, 1987, Computer Science Division, University of California, Berkeley, Calif. As described in a later article by P. Chen, E. Lee, G. Gibson, R. Katz and D. Patterson, "RAID: High-Performance, Reliable Secondary Storage", ACM Computing Surveys, Vol. 26. No. 2, June 1994, RAID technology has grown substantially and provides a natural solution to the continually growing demands for larger and improved storage systems.

A drive array is a collection of hard disk drives, otherwise referred to as physical drives, which are grouped together to create an array of physical drives. A drive array includes one or more subsets called logical drives or logical volumes which are typically spread across all of the physical drives in the drive array. An operating system views a logical drive as a single, contiguous storage space, even though the storage space may be made up of portions of several physical drives. One reason for building a drive array subsystem is to create a logical device that has a relatively high data transfer rate. A higher transfer rate may be accomplished by "ganging" multiple physical drives together and transferring data to or from the drives in parallel. For example, striping techniques are often used to distribute the data in a drive array. In striping, data is broken into segments of a unit length and sequential segments are written to several disk drives rather than to sequential locations on a single physical drive. The combination of corresponding sequential data segments across each of the disks in the disk array is a stripe. The stripe size affects data transfer characteristics and access times and is generally chosen to optimize data transfers to and from the disk array. The unit length is referred to as a block or segment or strip and usually includes one or more sectors, where each sector is 512 bytes. The first RAID level 0 uses data striping to achieve greater performance but does not use any fault tolerance techniques for data protection.

Data protection is another reason for using drive arrays, where fault tolerance methods are implemented within the array to protect the data against hardware failures. A popular solution is called mirroring or shadowing and is the technique used for RAID level 1. A drive array incorporating RAID level 1 includes a mirrored segment for each data segment, where the data is copied to both a data drive and a mirrored drive resulting in two copies of the same information. Alternatively for odd drive mirroring, data and mirrored segments are distributed among an odd number of drives greater than or equal to three. Mirroring provides the advantages of high reliability and relatively fast transfer rate but at a cost of storage efficiency since the storage space is utilized at a maximum of 50%. The higher RAID levels 2–5 use a parity scheme to achieve data redundancy. In the parity schemes, a controller writing data blocks to various drives within the array use the EXCLUSIVE-OR (XOR) function to create parity information, which is then written to a parity drive or parity segment within the array. For example, in a block-interleaved parity drive array according to RAID level 4, data is interleaved or striped across the disks and the corresponding parity information is stored in a corresponding block of a parity drive. A block-interleaved distributed parity drive array according to RAID level 5 is similar to RAID level 4, except that the parity information and the data is uniformly distributed across the drive array. The RAID levels 4 and 5 provide greater storage space efficiency than mirroring although typically at lower performance.

A computer system implementing RAID levels 4 and 5 achieve fault tolerance by calculating parity across drives of the array. The XOR operation is performed on each segment of data from each data drive in a drive array at a given offset and the result is stored (normally at the same offset) in a parity disk drive or a parity segment. The XOR operation is a time consuming activity because of the need to perform several read and write operations to update data and parity information. Existing or old data is read and combined with new data, and the results are written back to appropriate locations of the drive array. Various methods are known. In read-modify-write (RMW) operations, for example, old data and parity blocks are XOR'd with corresponding blocks of new data to be written to generate new parity data blocks, and the new data and parity blocks are written back to the array. In a regenerative write operation, remaining valid data is read from corresponding sectors of a stripe of data, XOR'd with new data to be written to generate a new parity block, and the new data and parity blocks are written back to the drive array.

In some drive array architectures, such as the SMART and SMART-2 Array Controllers by Compaq Computer Corporation, the XOR operations are performed in a region of memory called a "transfer buffer". The transfer buffer is a bank of memory within a drive controller that may include a multi-threaded interface. Control logic accepts CDB-based (command descriptor block) requests to XOR/zero/DMA regions of the transfer buffer and also accepts read/write slave requests. The CDB-base requests to perform certain operations are queued up and an interrupt is generated upon completion. In many operations, such as the regenerative or RMW operations discussed above, multiple blocks of data are combined in one or more XOR operations to obtain a block of parity data. The operations may be performed in a serial manner where each block is combined one at a time. It is preferable, however, to perform the operations in parallel where multiple requests are submitted simultaneously. To achieve parallelism the buffer must be cleared before the operations are performed since otherwise unknown initial contents of the memory would be XOR'd with incoming data resulting in unknown data.

Portions of the transfer buffer must be allocated for subsequent disk operations. Also, to ensure that the allocated portions of the transfer buffer are cleared prior to one or more XOR operations, a ZERO MEMORY CDB command had to be issued and completed before subsequent disk I/O commands were performed. Such allocation and/or zeroing, if necessary, are part of the real-time "garbage collection" tasks that are performed in the transfer buffer. The ZERO MEMORY CDB command, however, added a significant amount of overhead in the CDB-based command traffic stream which slowed disk transfer operations. It is desired to provide a method and system to reduce the number of queued commands that must be serviced by the array controller during disk drive operations.

SUMMARY OF THE INVENTION

A controller according to the present invention cleans buffer memory as a background task. The controller includes a transfer buffer, a memory that stores an index or table indicating free and non-zero data sectors within the transfer buffer, and processing logic that uses the transfer buffer for data transfer operations, and when otherwise idle, that scans the index table for contiguous sections of free and non-zero data sectors of the transfer buffer and that zeroes at least one of the contiguous sections. In this manner, the controller is more likely to find an appropriate size buffer of free and zeroed data sectors in the transfer buffer to perform parallel logic operations to generate new parity information. The present invention significantly reduces or relieves the controller from having to issue CDB-based memory commands to zero or clean an allocated buffer for performing disk transfer operations. Thus, the controller performs disk I/O operations faster and more efficiently.

The processing logic may include a processor and the controller memory may store software for execution by the processor, where the software includes buffer allocation routines for allocating buffers within the transfer buffer. The software may be in the form of firmware stored in a read only memory (ROM) or the like. The firmware may further include an idle task that scans the index table for the contiguous sections of free and non-zero data sectors and that zeroes at least one of the contiguous sections. The buffer allocation routines may further include a get routine that allocates a block of memory space from free and zeroed sectors within the transfer buffer. The get routine may include at least one input parameter to indicate buffer allocation requirements, and provide an output status to indicate success of the buffer allocation according to the requirements. The processing logic may further include a memory controller coupled to the transfer buffer via a multithreaded interface that performs simultaneous exclusive-OR logic operations into a single allocated buffer within the transfer buffer.

A computer system according to the present invention includes a drive array that stores data and corresponding parity data, a main memory, a processor that generates and stores data in the main memory and that sends a logical request to transfer the stored data to the drive array and an array controller that receives the logical request and that transfers the stored data to the drive array. The array controller further includes a transfer buffer, a local memory that stores an index indicating free data sectors and non-zero data sectors within the transfer buffer and processing circuitry that receives the logical request, that transfers the stored data to the transfer buffer, that combines the stored data with corresponding data from the drive array in a parallel operation to generate new parity data and that stores the data and new parity data to the drive array. When the array controller is otherwise idle, the processor scans the index for free and non-zero sections in the transfer buffer and then zeroes data sectors of at least one of the free and non-zero sections.

A method of cleaning a transfer buffer memory of a disk controller according to the present invention includes detecting an idle mode of the controller, searching an index for free and non-zero sections within the transfer buffer, and zeroing the contents of at least one contiguous free and non-zero section within the transfer buffer. The detecting may further comprise detecting when a processor of the array controller is executing an idle task. The searching may comprise searching from a beginning of the transfer buffer and the zeroing may comprising zeroing a first contiguous free and non-zero section within the transfer buffer from the beginning. Alternatively, the method may further comprise periodically repeating the detecting, searching and zeroing, and after each zeroing, setting a pointer to indicate a location within the transfer buffer after the contiguous free and non-zero section that was zeroed. Then, the searching comprises searching from the pointer previously set. The method may further comprise updating the index after each zeroing or cleaning of a section. The method may further comprise selecting one of a plurality of free and non-zero sections within the transfer buffer, such as selecting a free and non-zero section that would result in the largest contiguous free and zero section within the transfer buffer after zeroing.

It is now appreciated that a method and apparatus for zeroing a transfer buffer memory as a background task according to the present invention reduces and possibly eliminates the need to execute CDB-based commands or any other similar commands to clean buffer memory in response to a logical request by a computer to transfer data to a drive array. In this manner, the array controller is more likely to find an appropriate size buffer of free and zero data sectors in the transfer buffer for performing parallel XOR operations to generate new parity information. Thus, the controller operates faster and more efficiently.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1A:
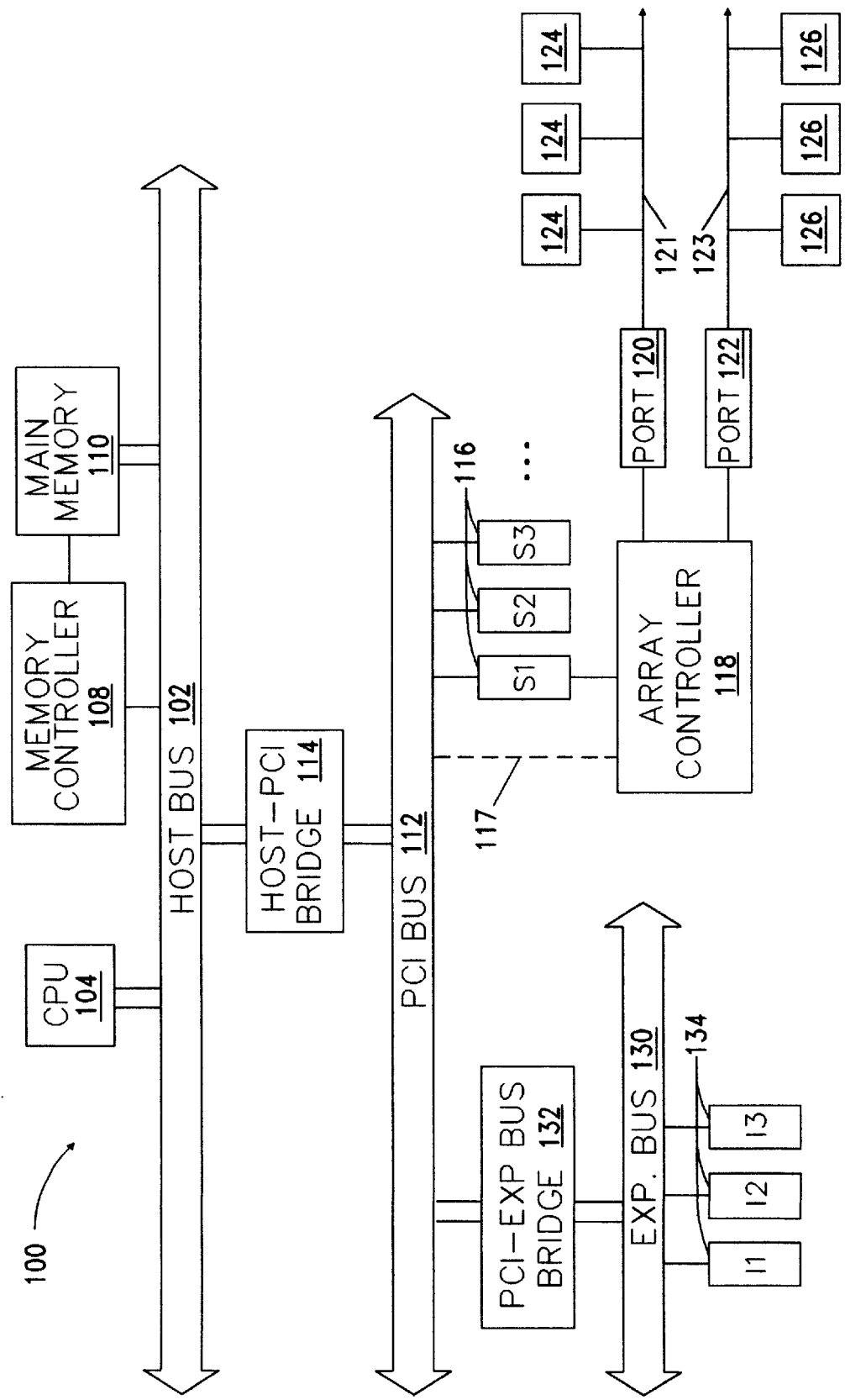
FIG. 1A is a block diagram of a computer system used in conjunction with an array controller implemented according to the present invention.

Referring now to FIG. 1A, a block diagram is shown of a computer system 100 used in conjunction with an array controller implemented according to the present invention. The computer system 100 is preferably an IBM-compatible, personal computer (PC) system or the like typically used for workstations or server systems. The computer system 100 includes a host bus 102 coupled to at least one central processing unit (CPU) 104. The CPU 104 preferably incorporates any one of several microprocessors and supporting external circuitry typically used in PCs, such as the 80386, 80486, Pentium™, Pentium™ II, etc. microprocessors from Intel Corp., where the external circuitry preferably includes an external or level two (L2) cache or the like (not shown). Although the present invention is illustrated with an IBM-compatible type PC system, it is understood that the present invention is applicable to other types of computer systems and processors as known to those skilled in the art.

A memory controller 108 is coupled to the host bus 102 and the main memory 110 to receive and control main memory operations. The main memory 110 is coupled to the host bus 102 via buffers (not shown) for data transfer. The main memory 110 may be implemented with one or more memory boards plugged into compatible memory slots on the motherboard, although any main memory configuration is contemplated. The computer system 100 preferably includes a PCI bus 112 coupled to the host bus 102 via a Host-PCI bridge 114, which handles translation of signals between the host bus 102 and the PCI bus 112. The PCI bus 112 is typically implemented with one or more PCI slots 116, individually labeled S1, S2, S3 and so on, where each of the PCI slots 116 are configured to receive compatible PCI adapter cards incorporating one or more PCI devices as known to those skilled in the art. Typical PCI devices include network interface cards (NICs) disk controllers such as a SCSI (Small Computer System Interface) disk controller, video or graphics controllers, etc. An array controller 118 implemented according to the present invention is fashioned as a PCI card that is plugged into one of the PCI slots 116 when a higher performance solution than a simple disk controller is desired. The array controller 118 also adds redundancy and fault tolerance.

It is noted that the computer system 100 may be implemented in any one of many alternative manners. For example, an industry standard architecture (ISA) bus or an extended ISA (EISA) bus could be substituted for the PCI bus 112. For an EISA bus, the Host-PCI bridge 114 would be replaced by an EISA bus controller (EBC) for handling transitions of signals between the host bus 102 and an EISA bus. The PCI slots 116 are instead EISA slots for receiving EISA compatible cards, and the array controller 118 is replaced by a corresponding array controller card implemented for interfacing an EISA bus. Alternatively, the computer system 100 includes an expansion bus 130 coupled to the primary PCI bus 112 through a PCI-Expansion bus bridge 132. The expansion bus 130 is any one of many different types, including another PCI bus, an ISA bus, an EISA bus or the microchannel architecture (MCA) bus, among others. For an EISA bus, the PCI-expansion bus bridge 132 is a PCI-EISA bridge. The expansion bus 130 preferably includes one or more expansion or input/output (I/O) slots 134, individually labeled 11, 12, 13, etc. An array controller configured for plugging into one of the slots 134 and for interfacing the expansion bus 130 could be used instead of the array controller 118. In yet another alternative embodiment, the array controller 118 is mounted on the motherboard of the computer system 100 and electrically interfaces the PCI bus 112 (or an ISA bus, an EISA bus, the expansion bus 130, etc.) as illustrated by a dotted line connection 117, where the connection to slot S1 is not used.

Other components, devices and circuitry are normally included in the computer system 100 though not shown as not being particularly relevant to the present invention. Such other components, devices and circuitry are coupled to the host bus 102, the PCI bus 112, the expansion bus 130 or other input/output (I/O) buses (not shown) that may be included. For example, the computer system 100 may include an integrated system peripheral (ISP), an interrupt controller such as an advanced programmable interrupt controller (APIC) or the like, arbiter(s), a system ROM (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Also, the computer system 100 includes a video controller and monitor (not shown) and a pointing device and controller (not shown), such as a mouse or the like.

Figure 1B:
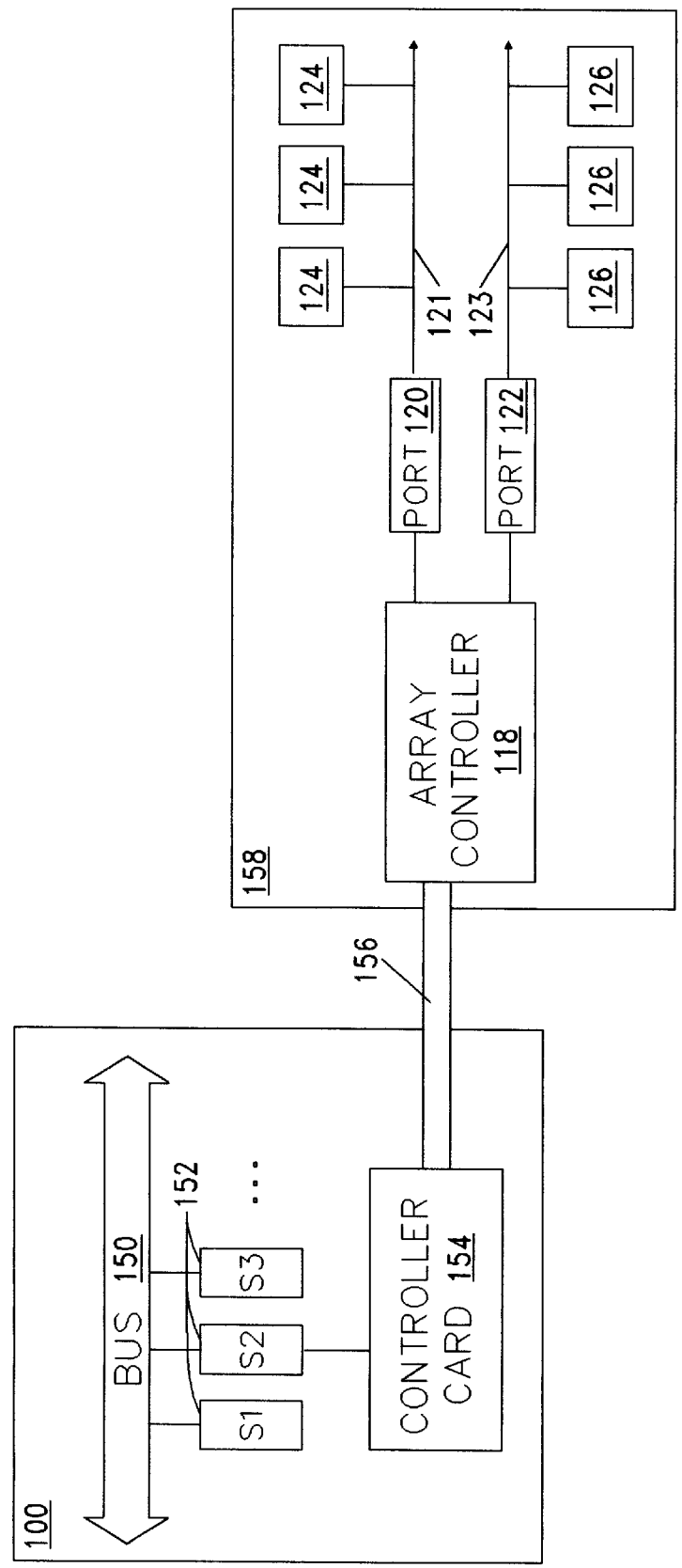
FIG. 1B is a block diagram of a computer system coupled to a separate storage box implementing an array controller implemented according to the present invention.

The array controller 118 is preferably implemented according to any of the SCSI standards and includes a SCSI port for interfacing a SCSI bus. As shown in FIGS. 1A and 1B, the array controller includes two SCSI ports 120, 122 for interfacing SCSI buses 121, 123, respectively. A series of SCSI hard disk drives 124 are coupled to the first SCSI bus 121 and another series of SCSI hard disk drives 126 are coupled to the second SCSI bus 123. The SCSI buses 121, 123 can be internal or external to the computer system 100 as desired. The array controller 118 and the disk drives 124, 126 may be implemented according to SCSI-1 (ANSI X3.131-1986), SCSI-2 (ANSI X3.131-1994) including Fast SCSI, Wide SCSI-2 and Fast Wide SCSI or SCSI-3, which includes a plurality or family of standards including Fast-20 SCSI, Ultra SCSI, DoubleSpeed SCSI, Ultra-2 SCSI, etc. The array controller 118 and the drives 124, 126 may alternatively be implemented according to any one of several disk drive implementations, such as the Integrated Drive Electronics (IDE), the AT Attachment (ATA) or ATA-2 or ATA-3, the enhanced-IDE (EIDE), the ATA Packet Interface (ATAPI), fiber optic, etc. The SCSI array controller 118 operates the various attached SCSI drives 124, 126 as an array of drives, preferably implementing striping and fault tolerant techniques such as RAID levels 1–5.

FIG. 1B illustrates another alternative embodiment in which the array controller 118, the SCSI ports 120, 122 and SCSI buses 121 and 123 and the SCSI hard disk drives 124 and 126 are provided in a separate storage box 158. The computer system 100 includes peripheral bus 150 that is any of the bus types previously described, such as PCI, ISA, EISA, etc. The peripheral bus 150 includes a plurality of slots 152 (S1, S2, S3, etc.). A controller card 154 is plugged into one slot 154 for interfacing the peripheral bus 150 to the array controller 118 via a bus or channel 156. The channel 156 may be of any suitable type, such as a SCSI bus or a fiber optic channel for higher throughput. If the channel 156 is a SCSI bus and the peripheral bus is PCI, then the controller card 154 could be a PCI to SCSI adapter card. For fiber optic capability, the controller card 154 is a PCI to Fiber Optic interface card that converts the cycles of the peripheral bus 150 to the appropriate communication across the fiber channel 156. The present invention is not limited to any particular type of technology or communication channel.

Figure 2:
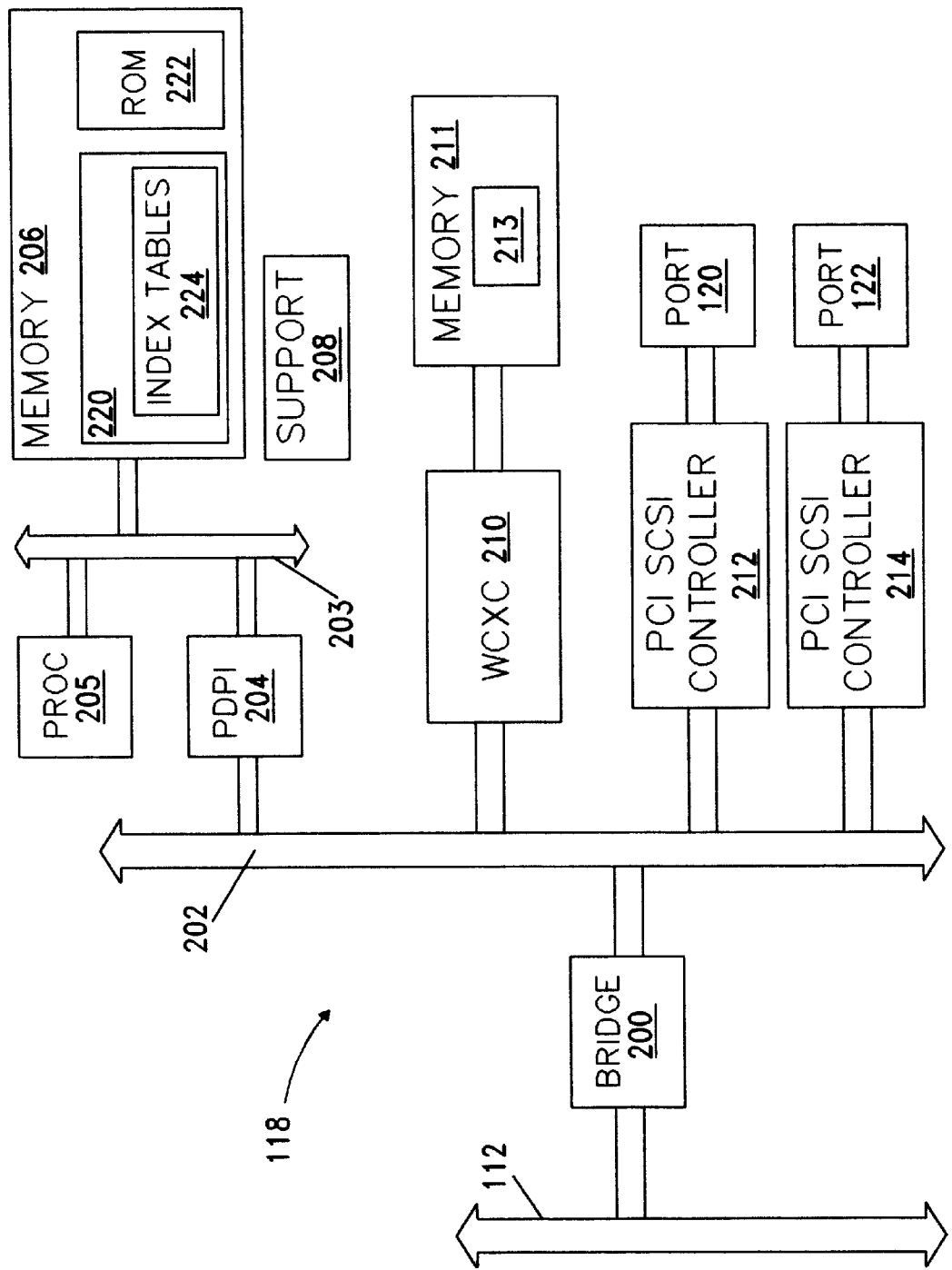
FIG. 2 is a block diagram of the array controller of FIGS. 1A or 1B that includes a processor, processor memory, memory controller and transfer buffer memory.

FIG. 2 shows more detail of the array controller 118. A bridge 200 is provided for interfacing the bus 112 to a local bus 202, which is preferably a PCI local bus. The specific configuration of the bridge 200 depends upon the types of buses 112 and 202. Assuming that the bus 202 is a local PCI bus, then the bridge 200 is either an EISA to PCI bridge, a PCI to PCI bridge, a fiber optic to PCI bridge, etc. The array controller 118 preferably includes a local processor 205 coupled to a local processor bus 203, where the local processor is any type of suitable processor such as the 29040 32-bit RISC processor by Advanced Micro Devices, Inc. (AMD). A local processor interface (PDPI) 204 is coupled between the PCI local bus 202 and the local processor bus 203 for interfacing the processor 205 to the PCI local bus 202. The processor 205 provides the main control for the array controller 118 for controlling configuration, data transfer, data organization, etc. The processor 205 is coupled to memory 206 and processor support circuitry 208 via the processor bus 203. The support circuitry 208 includes logic for providing support functionality for the processor 205, such as timers, interrupt controllers, memory controllers and so on. The memory 206 includes programmable memory 220, such as random access memory (RAM) or the like, and a ROM 222 for storing firmware. The memory 206 stores operating instructions for the processor 205 and program memory for controlling operations of the processor 205. Firmware stored in the ROM 222 controls the configuration and operation of the array controller 118 for storing data in and retrieving data from the disk drives 124, 126. The routines and procedures for zeroing a transfer buffer memory according the present invention is preferably implemented within the firmware stored in the ROM 222. Also, the programmable memory 220 stores one or more index table(s) 224 that provide information on the memory space of a transfer buffer 213, described further below, for purposes of memory management and control.

A PCI memory controller and XOR engine (WCXC) 210 is coupled between the PCI local bus 202 and a memory 211. The memory 211 preferably comprises dynamic RAM (DRAM) and includes the transfer buffer 213 for temporary storage of disk data and/or command packets. The transfer buffer 213 preferably includes approximately 2 megabytes (MB) of DRAM memory including 4K sectors of 512 bytes each. The processor 205 maintains the index tables 224 to perform memory management to control the memory space of the transfer buffer 213. Data read from any of the disk drives 124, 126 may be temporarily stored within the transfer buffer 213 before being transferred to the main memory 110 via the bridge 200, and data to be written to the disk drives 124, 126 from the main memory 110 may be temporarily stored in the transfer buffer 213. The memory 211 may further include cache memory and functions, battery backed, parity checked and mirrored memory for posted writes to the disk drives 124, 126. The interface between the WCXC 210 and the memory 211 is multi-threaded for enabling simultaneous data transfers. The WCXC 210 further includes a 16-deep interface to accept up to 16 CDB-based requests (command descriptor block) at a time from the processor 205. The WCXC 210 performs each of the CDB requests in order and upon completion, asserts an interrupt to the processor 205.

The PCI local bus 202 is further coupled to two PCI SCSI controllers 212 and 214. The SCSI controller 212 is coupled to the disk drives 124 via the port 120 and the SCSI bus 121 and the SCSI controller 214 is coupled to the disk drives 126 via the port 122 and the SCSI bus 123. Any number of PCI SCSI controllers may be included for coupling to corresponding SCSI ports and buses as desired. The disk drives 124, 126 and the corresponding interface to the array controller 118 may be implemented in a variety of different ways. Although two SCSI controllers are shown for purposes of a large storage capacity, a single SCSI controller may be used to reduce cost or additional SCSI controllers could be used to increase capacity and performance. As described previously, the disk drives 124, 126 may be implemented according to a different standard, such as IDE, ATA, ATA-2, ATA-3, EIDE, ATAPI, fiber optic, etc. Fiber optic drives, for example, would interface a fiber optic channel and one or both of the PCI SCSI controllers 212 and 214 would be replaced by one or more PCI-Fiber controllers.

The WCXC 210 operates as a bus master or as a slave device on the PCI local bus 202 for transferring data to and from the memory 211. If operating as a slave, data transfer is controlled by another PCI bus master on the PCI local bus 202 or on the bus 112 via the bridge 200. The WCXC 210 responds to a particular range of addresses for storing data within the memory 211. Data transfers to addresses outside this particular address range are addressed to the disk drives 124, 126 or to external memory of the computer system 100 coupled through the bus 112. The WCXC 210 also performs XOR operations for generating and storing parity information. Preferably, a high address bit is set to select XOR operations versus write operations, where the XOR operations are performed during data transfer into the memory 211. The PCI SCSI controllers 212, 214 both operate as PCI bus masters for controlling data transfers to and from any of the disk drives 124 and 126, respectively.

It is understood that the array controller 118 may be implemented in any one of many different ways and include various functions and capabilities known to those skilled in the art and beyond the scope of the present disclosure. The one or more PCI SCSI controllers 212, 214, the processor 205 and the memory 206 are the primary parts of a control entity that controls data organization and data flow associated with one or more disk arrays formed from the disk drives 124, 126. In general, the PCI SCSI controllers 212, 214 control data read and write operations to and from the disk drives 124, 126 coupled to the SCSI buses 121, 123, respectively, according to the particular SCSI option and as controlled by the processor 205. The processor 205 controls data flow and organization on the disk drives 124, 126.

Figure 3A:
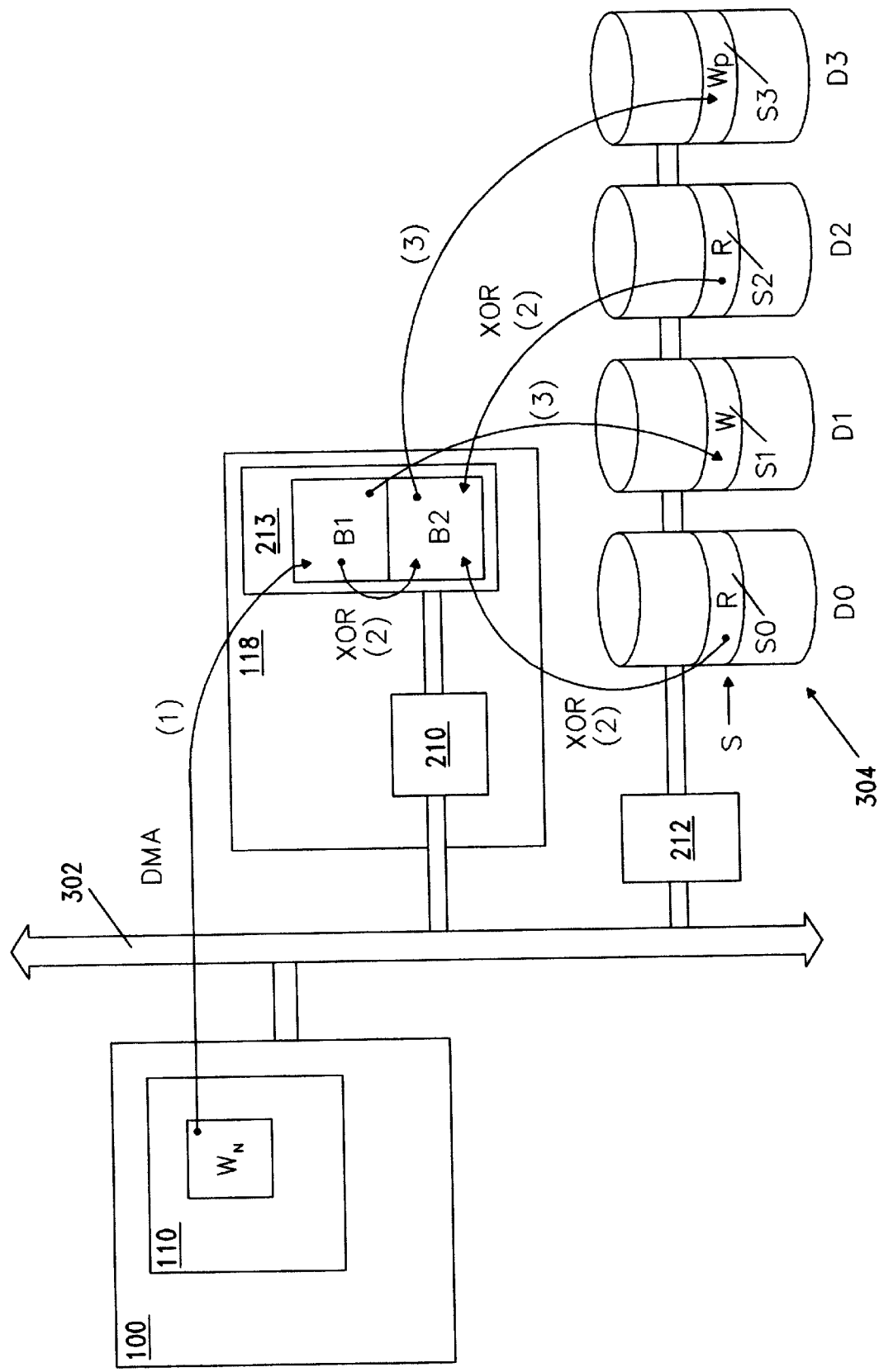
FIG. 3A is a figurative diagram illustrating a read modify write (RMW) operation for writing a segment of new data from main memory of the computer system to overwrite a corresponding segment of a drive array using the transfer buffer.

FIG. 3A is a figurative diagram illustrating a read modify write (RMW) operation for writing a block or segment of new data ($W_N$) from main memory 110 to overwrite a corresponding segment (S1) of a drive array 304 using the WCXC 210 and the transfer buffer 212. FIG. 3A is simplified in that only portions of the computer system 100 and the array controller 118 are shown. Also, a bus 302 is used to generally represent the interfacing bus structure, connectors, bridges, etc. coupled between the computer system 100 and the array controller 118. For example, the bus 302 represents any bus structure such as including the PCI bus 112 or the bus peripheral 150, the controller card 154 and the channel 156, the bridge 200, the PCI bus 202, etc. The WCXC 210 is shown for facilitating data transfers to and from the transfer buffer 211 and the PCI SCSI controller 212 is shown for facilitating transfer of data to and from the drive array 304.

The drive array 304 includes four disk drives labeled D0, D1, D2 and D3, respectively, which could be any four of the disk drives 124 or 126. The drive array 304 is preferably implemented according to one of the RAID levels, such as RAID level 4 or 5, where data is provided in corresponding data segments striped across the drive array 304. For example, a stripe S includes segments S0, S1, S2 and S3 on disk drives D0–D3, respectively, where the segment S3 is the parity data segment for the stripe S. The computer system 100 has generated a new segment $W_N$ to replace the segment S1, which is labeled W to indicate the ultimate write operation to overwrite the old data in the segment S1. The parity segment S3 must also be updated and is correspondingly labeled "$W_p$".

The processor 205 of the array controller 118 first allocates two buffers labeled B1 and B2 from a freepool of memory within the transfer buffer 213 for facilitating the data transfer. The freepool of memory includes any memory that has not been allocated for other transactions. Each of the allocated buffers B1, B2 have a size corresponding to the new data block $W_N$ and the size of each of the segments S0–S3. Prior to the present invention, the processor 205 issued a "GET" routine to perform each buffer allocation of the transfer buffer 213, where the GET routine indicated the number of sectors needed. The GET routine retrieved the indicated number of sectors without any determination of the data content of the buffer. After the buffer was used for one or more data transfers, a "FREE" routine was issued to return the allocated sectors of the buffer to the free pool of memory.

In a first (1) data transfer operation, the new data block $W_N$ is transferred to the buffer B1 in any one of several different ways, such as a direct memory transfer (DMA) controlled by the WCXC 210. For DMA, the processor 205 sends a CDB command for the DMA transfer to the WCXC 210, which then executes the DMA transfer. In a second (2) transfer operation, the new data block $W_N$ from the buffer B1, the data in the data segment S0 and the data in the data segment S2 are XOR'd together in the second allocated buffer B2 within the transfer buffer 213 to generate the new parity information. The data segments S0 and S2 are read from the disk drives D0 and D2, respectively, as indicated by the label "R". In a third (3) transfer operation, the data block $W_N$ within the buffer B1 is written to the segment S1 of disk drive D1 and the new parity block within the buffer B2 is written to the parity segment S3 of the disk drive D3 as indicated by $W_p$.

The XOR operation may be performed in any one of several ways. In a serial operation, for example, the new data block $W_N$ could be copied to the buffer B2, then the data segment S0 is XOR'd with the data block $W_N$ within the buffer B2, and finally the data segment S2 is XOR'd with the data in the buffer B2 resulting in the new parity data block. Performing the XOR operation in a serial manner has the advantage that neither of the buffers B1 or B2 have to be initially cleared since they are written over with new data. Such serial operation, however, is not desirable from a performance standpoint. The WCXC 210 is capable of performing the XOR operations into the buffer B1 simultaneously since the transfer buffer 213 has a multi-threaded interface. To achieve parallelism and improved performance, multiple XOR requests are submitted to the WCXC 210 and performed simultaneously in the buffer B2. In particular, the data block $W_N$ in the buffer B1 and both of the data sectors S0 and S2 are simultaneously XOR'd into the buffer B2. However, since it is not determinable which transfer occurs first, the buffer B2 must first be zeroed since otherwise faulty data would result according to the property of the XOR operation. For example, if the buffer B2 is "dirty" or otherwise contains old or non-zeroed data and the sector S0 is XOR'd into the dirty buffer B2, then the resulting contents of the buffer B2 is not determinable.

Prior to the present invention, the processor 205 allocated one or more buffers of free sectors within the transfer buffer 213 to regardless of whether the sectors were zeroed or not. If an allocated buffer had to be zeroed to ensure data integrity in a parallel operation, then the processor 205 issued a ZERO MEMORY CDB command to the WCXC 210 prior to the disk drive I/O transfer(s). In the above RMW example, the buffer B1 is allocated and need not be zeroed since the new data written via the DMA transfer overwrites any old data. The processor 205 issues a ZERO MEMORY CDB command to the WCXC 210 to zero the buffer B2. The ZERO MEMORY CDB command may be issued before or after DMA CDB command to transfer the data block $W_N$ into the buffer B1. However, the ZERO MEMORY CDB command had to be issued and completed before the XOR operations were initiated to ensure data integrity. Prior zeroing of a buffer in this manner added overhead and a significant amount of time for each transfer, which tended to slow disk I/O operations.

Figure 3B:
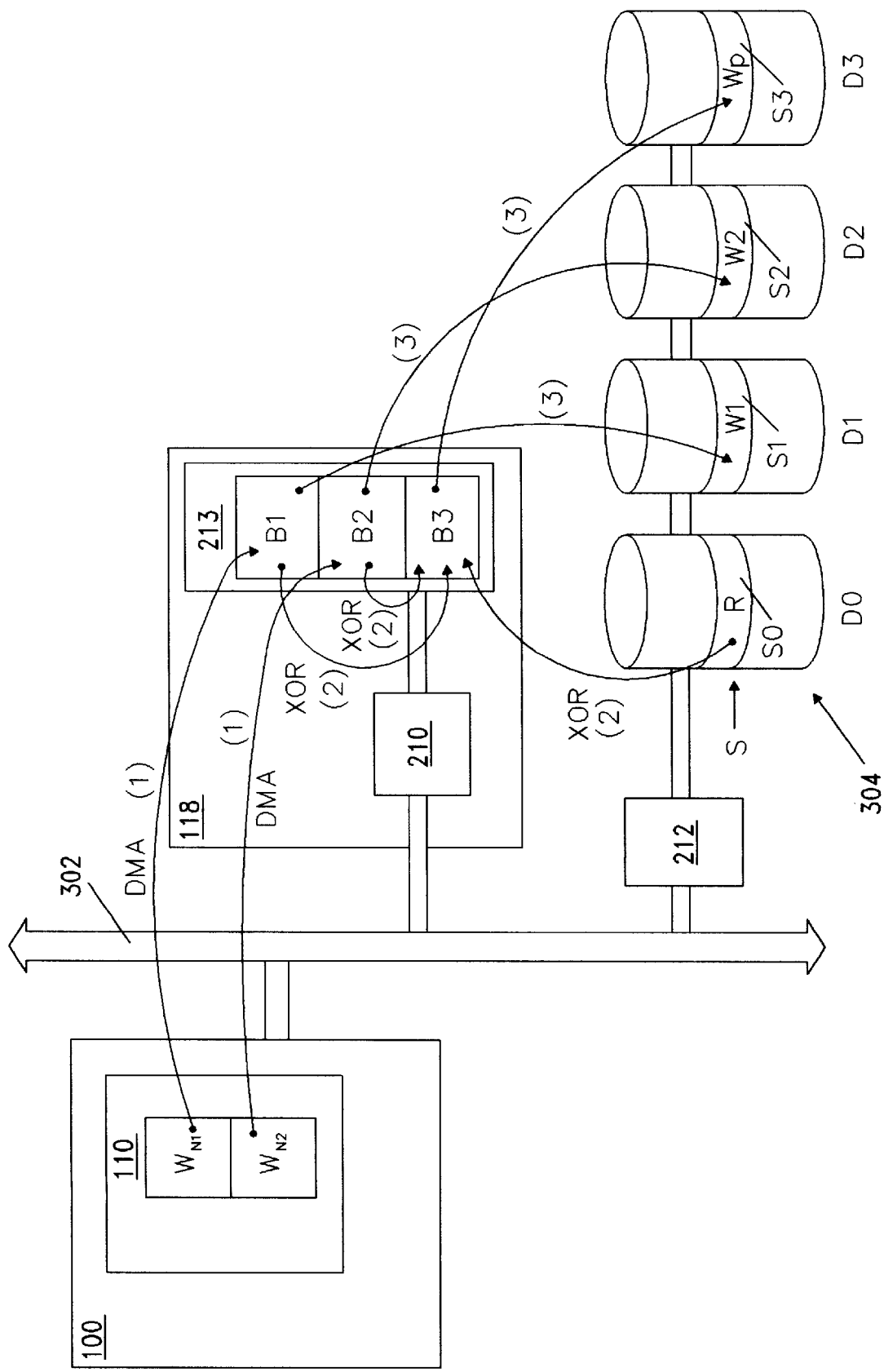
FIG. 3B is a figurative diagram illustrating a regenerative write operation for writing two segments of new from main memory of the computer system to overwrite corresponding segments of the drive array using the transfer buffer.

FIG. 3B is a figurative diagram illustrating a regenerative write operation for writing two segments of new data ($W_{N1}$ and $W_{N2}$) from main memory 110 to overwrite corresponding segments S1 and S2 of the drive array 304 using the WCXC 210 and the transfer buffer 213. FIG. 3B is simplified in a similar manner as FIG. 3A where similar components assume identical reference numerals. Again, the drive array 304 includes the four disk drives D0–D4 and includes a stripe S with segments S0–S3 on the disk drives D0–D3, respectively, where the segment S3 is the parity data segment for the stripe S. The computer system 100 has generated two new segments $W_{N1}$ and $W_{N2}$ to replace the segments S1 and S2, respectively, which are labeled W1 and W2, respectively. As before, the parity segment S3 must also be updated and is correspondingly labeled $W_p$. In the regenerative write case, the corresponding segment S0 of the segments to be overwritten is XOR'd with the new data segments to generate the new parity segment $W_p$. The processor 205 issues a GET routine to allocate two buffers B1 and B2 for the new data blocks $W_{N1}$ and $W_{N2}$, and a third buffer B3 for the XOR operations.

In a first (1) transfer operation, the processor 205 issues two CDB commands to the WCXC 210 to perform DMA transfers of the data blocks $W_{N1}$ and $W_{N2}$ into the buffers B1 and B2, respectively. Prior to the present invention, the processor 205 also had to issue a ZERO MEMORY CDB command to zero the buffer B3. The two DMA and ZERO MEMORY CDB commands may be issued in any order, but the ZERO MEMORY command had to be completed before any of the XOR operations were initiated. After the buffer B3 was zeroed, the processor 205 initiated a second (2) transfer operation by issuing the XOR CDB commands to XOR the contents of each data block $W_{N1}$ and $W_{N2}$ in the buffers B1 and B2, respectively, and by also issuing a CDB XOR command to read (R) the sector S0 from the disk drive D0 and XOR the sector S0 into the buffer B3. The processor 205 then performed a third (3) transfer operation by issuing the appropriate CDB commands to the WCXC 210 to transfer the data block $W_{N1}$ from buffer B1 into the sector S1 of the disk drive D1, to transfer the data block $W_{N2}$ from buffer B2 into the sector S2 of the disk drive D2 and to transfer the new parity block from buffer B3 into the parity sector S3 of the disk drive D3. Finally, the processor 205 issued a FREE routine to return the buffers B1–B3 to the freepool of memory.

Prior to the present invention, the freepool of memory in the transfer buffer 213 became dirty or non-zeroed after disk transfer operations. The ZERO MEMORY CDB command had to be issued after receiving each logical write request from the computer system 100 that involved XOR operations requiring zeroed buffers to ensure data integrity.

According to the present invention, the index tables 224 include allocation, free and non-zero information for each of the sectors of the transfer buffer 213 for purposes of memory management. In a first embodiment, several arrays are defined and maintained within the index tables 224. For example, a first array BUFFER_POOL[] generally indicates where the transfer buffer 213 is located in memory space and the size of the transfer buffer 213. A second buffer ALLOC_XBUF[] indicates which sectors within the transfer buffer 213 are allocated for data transfer operations. A third array FREE_POOL[] indicates which sectors within the transfer buffer 213 are free and available for new buffer allocations, such as the freepool of memory previously described. A fourth array DIRTY_POOL[] indicates which sectors within the transfer buffer 213 are non-zero. The ALLOC_XBUF[], FREE_POOL[] and DIRTY_POOL[] arrays include elements to map the transfer buffer 213, where each element corresponds to a corresponding data sector of the transfer buffer. For example, the DIRTY_POOL[] array may be an array of bits forming a bitmap of the transfer buffer, where each bit indicates whether the corresponding sector is zero or non-zero. Alternatively, the elements of each array are bytes, words, double words (DWORDs), etc. or any other element size convenient for the processor 205. In this manner, the processor 205 executes an appropriate routine to scan the FREE_POOL[] array to determine which sectors of the transfer buffer 213 are available for allocation, and to scan the DIRTY_POOL[] array to determine which sectors of the transfer buffer 213 are non-zero.

Alternative embodiments of the index table 224 are contemplated. The ALLOC_XBUF[] and FREE_POOL[] contain redundant information and may be implemented by a single array. The FREE_POOL[] array may be replaced by a FREE_COUNT[] array of count elements. In particular, during allocation, the routine called by the processor 205 determines how many times the allocated buffer is to be used and inserts count values within the corresponding elements of the FREE_COUNT[] array. After each use, the count elements are decremented by the FREE routine and the corresponding sectors are considered free when decremented to zero. In another embodiment, a single MEMORY[] array is defined where each element includes at least two bits: a first allocation bit indicative of whether the corresponding sector is allocated or free and a second bit indicative of whether the corresponding sector is zero or non-zero.

In another embodiment, the index tables 224 include a linked list of memory pool descriptors, where each descriptor is a data structure that includes information about corresponding sectors in the transfer buffer 213. For example, the following memory data structure is defined:

```
Struc mem_pool_descriptor {
    Struct mem_pool_descriptor *next-free;
    DWORD                      buffer_address;
    DWORD                      bytes_allocated;
    DWORD                      end_address;
    DWORD                      free_count;
    BOOL                       clean_buffer;
};
``` where *next_free is an address pointer to the next descriptor, buffer_address is a beginning address of the current buffer, end_address is an ending address of the current buffer, bytes_allocated indicates the number of bytes within the current buffer, free_count indicates whether the buffer is allocated or free and clean_buffer indicates whether the current buffer is zero or non-zero.

It is appreciated that any of the data formats or structures defined above or other suitable structures within the index tables 224 are sufficient for describing which sectors are free and which sectors are non-zero of the transfer buffer 213. In this manner, the processor 205 simply scans the one or more arrays or structures to determine the status of the transfer buffer 213 for purposes of allocating buffer memory for data transfers.

Figure 4:
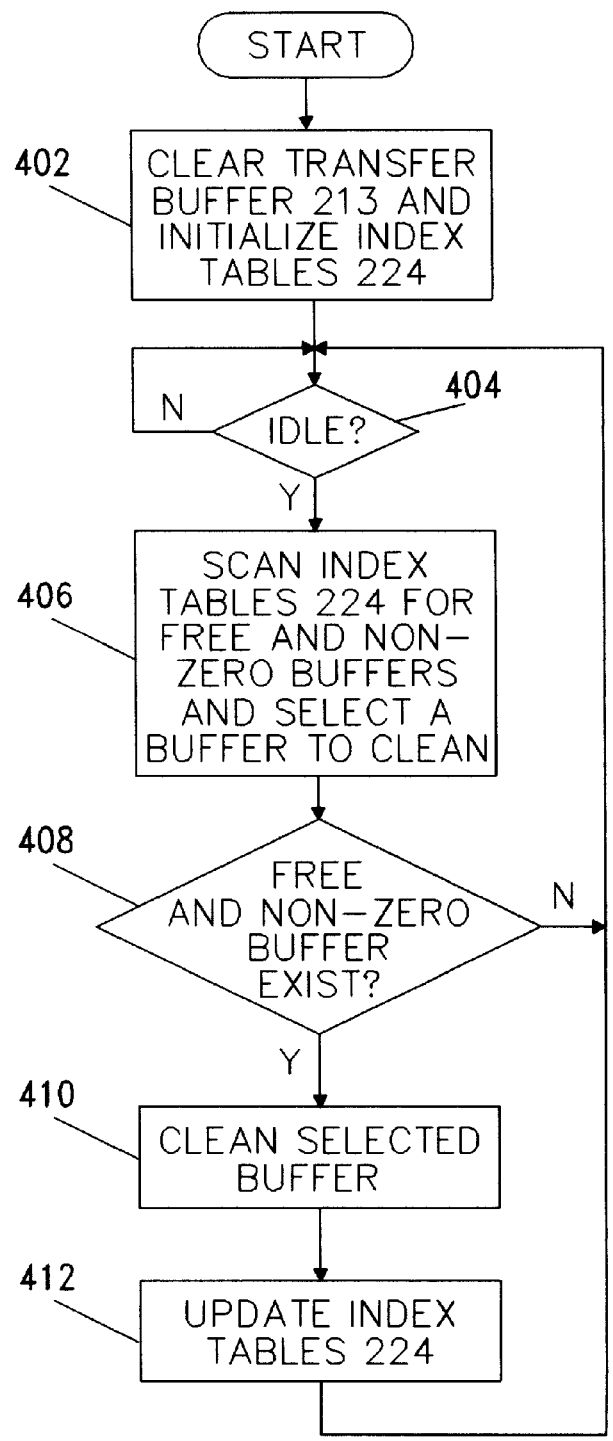
FIG. 4 is a flowchart diagram of a memory clean routine according to the present invention executed by the processor of the array controller to zero free portions of the transfer buffer.

Referring now to FIG. 4, a flowchart diagram is shown of a CLEAN memory routine according to the present invention executed by the processor 205 to zero or "clean" free sectors of the transfer buffer 213. In the preferred embodiment, the CLEAN memory routine illustrated by the flowchart is performed in the "background" or when the array controller 118 is not performing any cache flushing or disk I/O operations. In general, the processor 205 scans the index tables 224 for free and non-zero memory locations of the transfer buffer 213 and then explicitly zeroes the memory locations. The processor 205 then updates the index tables 224 to reflect the cleaned memory locations. The processor 205 continues this process until all the free memory is zeroed or until interrupted for cache flushing or disk I/O operations. After being interrupted, the CLEAN memory routine returns to scanning for and cleaning free and non-zero memory when the processor 205 is idle.

A first step 402 is generally performed upon power up during power on self test (POST) operations of the array controller 118, during which the processor 205 zeroes the entire transfer buffer 213 and initializes the index tables 224. At next step 404, the processor 205 determines whether the processor 205 of the array controller 118 is idle or not. Operation remains at step 404 while the processor 205 is active. The processor 205 of the array controller 118 is not idle when handling logical disk I/O requests from the computer system 100 to either read data from or write data to any of the disk drives 124 or 126. The array controller 118 may temporarily store valid data in a battery-backed cache of the memory 211 for transfer to the disk drives 124, 126 during posted writes. The processor 205 of the array controller 118 is not idle while handling flushing the cache to store the valid data. It is noted that even under heavy disk I/O, the processor 205 spends up to approximately 90% of its time idle or in an "idle task". Even during flushes of posted writes to a disk drive, the processor 205 is in the idle task approximately 60% of the time on the average. These percentage values are dependent upon the number of drives, the size of the requests and other factors.

When the processor 205 becomes idle or is performing the idle task, operation proceeds to next step 406, where the processor 205 scans the index tables 224 to identify one or more free and non-zero data buffers in the transfer buffer 213. The index tables 224 may be configured in any convenient manner as previously described to identify free and non-zero memory buffers, such as one or more arrays, structures, linked lists, etc. The transfer buffer 213 may become fragmented during disk I/O operations to include a plurality of allocated, free and non-zero and free and zero locations. The processor 205 may use any one or more criterion to identify which free and non-zero buffer to clean during each iteration of step 406. In a first embodiment, the processor 205 simply cleans the first buffer of free and non-zero memory it encounters. The processor 205 may start at the beginning of the transfer buffer 213 each time, or may set an address pointer after each cleaned section and cycle through the transfer buffer 213. Alternatively, the processor 205 identifies the location and size of each free and non-zero buffer and generates a priority list. The prioritization scheme may be programmed to select a free and non-zero buffer based on any criterion, such as the smallest buffer, the largest buffer, the buffer that when cleared would result in the largest space of contiguous free and non-zero memory, etc. It is appreciated that a plurality of various priority schemes are possible for determining which buffer to clean first.

After selection of a free and non-zero location at step 406, operation proceeds to next step 408, where the processor 205 determines whether there are any free and non-zero memory buffer locations at all. If not, then the transfer buffer 213 is generally considered defragmented and operation returns to step 404. Otherwise, if a free and non-zero buffer was found and selected, then operation proceeds to step 410, where the processor 205 cleans or sends a command to clean the selected buffer. In a first embodiment, the processor 205 becomes a bus master on the PCI bus 202 and the WCXC 210 acts as a slave device. The processor 205 performs MEMSET() commands on a slave channel to access and set to zero one or more DWORDs or sectors of the selected buffer of the transfer buffer 213. This manual slave solution is generally slower than the ZERO MEMORY CDB command, but may be interrupted at any time by a logical request or cache flushing operation. In this manner, an incoming request from the computer system 100 is not significantly delayed. Alternatively, the processor 205 issues a ZERO MEMORY CDB command to the WCXC 210 on a "master" channel, where the WCXC 210 proceeds to clean the selected buffer in the transfer buffer 213. Although the CDB command method is faster, it has the disadvantage that the processor 205 may not stop or otherwise interrupt the CDB command once initiated. In either case, the cleaning routine is at least partly performed during idle time of the processor 205, and thus improves overall data transfer performance by a significant amount.

At next step 412, the processor 205 updates the index tables 224 to reflect the cleaned memory buffer in the transfer buffer 213, and operation returns to step 404. Operation continuously loops between steps 404–412 during operation of the array controller 118 while idle until the transfer buffer 213 is defragmented as determined at step 408. Once defragmented, operation loops between steps 404–408 while idle until the next disk I/O or cache flushing operation is received and serviced. After a disk I/O operation, one or more buffers in the transfer buffer 213 will usually be free and non-zero and require cleaning. Since the array controller 118 is generally idle a significant amount of time, successive iterations of steps 410 and 412 tend to maintain the transfer buffer 213 relatively defragmented resulting in larger contiguous areas of free and zero memory space when buffer allocations are needed. This reduces and often eliminates of the need to execute the ZERO MEMORY CDB command during disk I/O operations.

In one embodiment according to the present invention, the processor 205 executes a GET routine with the following parameters:

DWORD get_transfer_buffer (
  BOOL zero,
  DWORD size_requested,
  DWORD *descriptor_address,
  DWORD free_count);

where zero is passed by the calling program as a flag or code to indicate that a zeroed block is required, size_requested indicates the size of buffer needed and is returned as the size of buffer allocated, *descriptor_address is returned as an address pointer to the allocated buffer space and free_count is passed as a use counter indicating the number of times the buffer will be used before the buffer is considered free. The actual code of the GET routine searches the index tables 224 in the designated format for free buffer space. If the zero flag is true, then the GET routine returns only a zeroed buffer of the indicated size. If the zero flag is false when passed, then the GET routine simply returns a buffer from any space regardless of whether zeroed or not.

The CLEAN memory routine executing in the background provides a higher probability that the GET routine is successful in finding a free and zero buffer of the required size. It is noted, however, that the GET routine may fail to find enough free and zero space for the desired buffer size, so that the get_transfer_buffer parameter itself may be used to determine the success of the routine. If not successful, the processor 205 may continue to execute the GET routine until successful in a loop, or may alternatively allocate a dirty buffer and send a ZERO MEMORY CDB command to clean the buffer.

A corresponding FREE routine includes the following parameters:

void free_transfer_buffer (DWORD *descriptor_address); where the *descriptor_address identifies the address of a previously allocated buffer to be freed and where the FREE routine decrements the corresponding free_count value within the corresponding array or structure within the index tables 224.

In an alternative embodiment, the GET routine does not include the zero parameter and is used by the processor to allocate non-zero buffer space. When zeroed buffer space is required to be allocated, a new GET ZERO routine is used that has the following parameters:

DWORD get_zero_transfer buffer (
  DWORD size_requested,
  DWORD *descriptor_address,
  DWORD free_count,
  DWORD *zero_success);

including a zero_success pass code. The zero_success is a code passed by the caller to indicate the manner in which the buffer is needed, and is returned as a code indicating the success of the call. In particular, if zero_success= IMMEDIATE when passed, then the GET ZERO routine always returns a buffer, although the buffer may not be zeroed. If not zeroed, the calling routine may use the ZERO MEMORY CDB command to clean the buffer. If zero_success=FORCE when passed, then the GET ZERO routine manually finds an optimal region and zeroes it. Using the FORCE code may cause the GET ZERO routine to take in indeterminate amount of time because the routine may have to perform the MEMSET() slave channel function or WCXC zero buffer CDB command across the PCI bus 202 to clean the buffer if there is not enough zeroed memory available in the transfer buffer 213. However, the CLEAN memory routine reduces the probability that the GET ZERO routine with the FORCE code must clean memory. If zero_success= WAIT when passed, then the GET ZERO routine returns a zeroed buffer if available but otherwise does not allocate a buffer at all. If a buffer is not allocated, then the calling routine may either continuously call the GET ZERO routine with the WAIT pass code in a loop until successful or make an alternative choice.

The pass codes are summarized in the following Table I:

TABLE I

Action Matrix by Pass Code for the GET ZERO routine

| Inp Param/Ret Code | SUCCESS | BUSY | NO_CLEAN |
|---|---|---|---|
| IMMEDIATE | z'd buff allocated | nz'd buff allocated | nz'd buff allocated |
| FORCE | z'd buff allocated | z'd buff allocated | z'd buff allocated |
| WAIT | z'd buff allocated | No allocation | No allocation | where the leftmost column of Table I lists the input pass codes IMMEDIATE, FORCE and WAIT and the top column lists the output pass codes SUCCESS, BUSY and NO_CLEAN for the zero_success parameter. The result "z'd buff" indicates that the buffer is zeroed and the result "nz'd buff" indicates a non-zeroed buffer. The SUCCESS return code indicates that the routine successfully returned a zeroed buffer. The BUSY return code indicates that the routine had to sleep while waiting on available memory and the NO_CLEAN return code indicates that the routine had to wait (or would have to wait) for the buffer to be zeroed.

Figure 5:
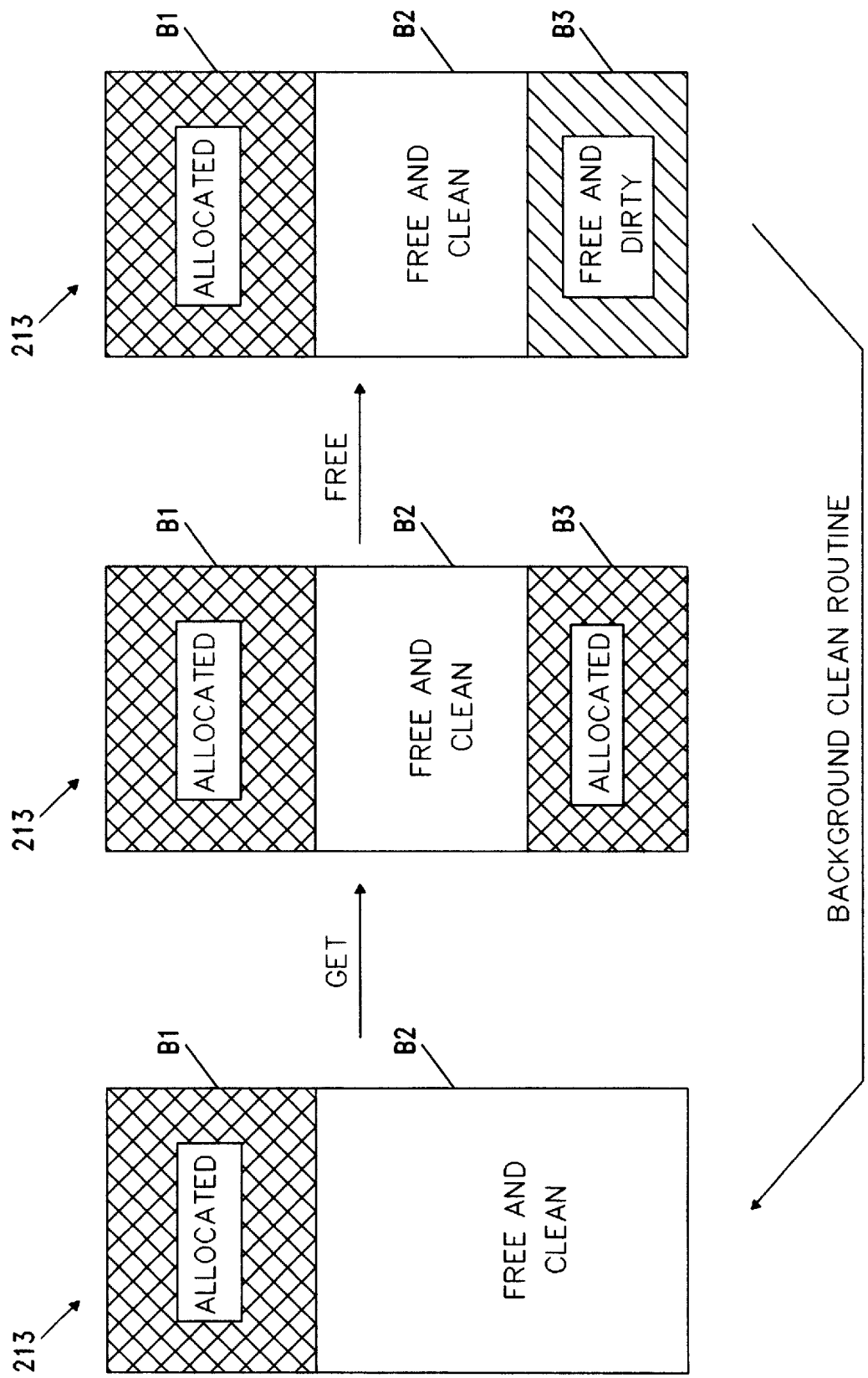
FIG. 5 is a figurative diagram illustrating operation of the memory clean routine according to the present invention to zero free portions of the transfer buffer.

Referring, now to FIG. 5, a figurative diagram is shown illustrating operation of the CLEAN memory routine according to the present invention to zero free portions of the transfer buffer 213. The transfer buffer 213 begins with an allocated buffer B1, where the remaining space forms a free and clean buffer B2. The processor 205 receives a disk I/O request and correspondingly executes the GET routine to allocate a buffer B3 from the B2 buffer thereby reducing the size of the buffer B2. After the disk I/O request is handled, the processor 205 executes the FREE routine to free the buffer B3. Although the memory area of buffers B2 and B3 are free, the space is fragmented in that buffer B3 is free and non-zero. The processor 205 could not use any space of the buffer B3 as a zero buffer without executing the ZERO MEMORY CDB command. After performing the disk I/O using the buffer B3, the processor 205 temporarily enters the IDLE task. The CLEAN memory routine detects the IDLE mode and the processor 205 scans the index tables 224 to locate buffer B3 as free and non-zero. The processor 205 then cleans the buffer B3, where buffer B3 is recaptured back into the buffer B2 as a larger contiguous block of free and zero memory.

It is now appreciated that a method and apparatus for zeroing a transfer buffer memory as a background task according to the present invention reduces and possibly eliminates the need to execute the ZERO MEMORY CDB command or any other similar command in response to a logical request by a computer to transfer data to a drive array. An array controller according to the present invention includes a transfer buffer, memory and processing logic or circuitry to respond to the logical request and perform the data transfer operation from the computer to the drive array. The memory of the array controller stores an index or table that indicates whether each data sector in the transfer buffer is free or allocated and whether the data sectors are dirty or clean. When the array controller is otherwise idle, the processing circuitry scans the index for free and non-zero data sectors in the transfer buffer and if found, cleans one or more sections by zeroing the data sectors therein. The index is then updated. In this manner, the array controller is more likely to find an appropriate size buffer of free and zero data sectors in the transfer buffer for performing parallel XOR operations to generate new parity information for updating parity information in the drive array.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A controller that cleans buffer memory as a background task, comprising:

a transfer buffer;

a memory that stores an index table indicating free and non-zero data sectors within said transfer buffer; and processing logic coupled to said transfer buffer and said memory that uses said transfer buffer for data transfer operations, and when otherwise idle, that scans said index table for contiguous sections of free and non-zero data sectors of said transfer buffer and that zeroes at least one of said contiguous sections of free and non-zero data sectors without accessing a host bus.

2. The controller of claim 1, further comprising:

said processing logic including a processor; and said memory storing software for execution by said processor.

3. The controller of claim 2, wherein said software includes an idle task that causes said processor to scan said index table for free and non-zero sections in said transfer buffer and to zero data sectors of at least one of said free and non-zero sections within said transfer buffer.

4. The controller of claim 2, wherein said software includes a get routine that allocates a block of memory space from free and zeroed sectors within said transfer buffer.

5. The controller of claim 4, wherein said get routine includes at least one input parameter to indicate buffer allocation requirements and returns an output status to indicate success of allocating a buffer according to said buffer allocation requirements.

6. The controller of claim 1, wherein said processing logic further comprises:

a memory controller coupled to said transfer buffer via a multithreaded interface to enable performance of simultaneous exclusive-OR logic operations into a single allocated buffer of said transfer buffer.

7. A method of cleaning a transfer buffer memory of a disk controller, comprising:

detecting an idle mode of the controller;

searching an index for fire and non-zero sections within the transfer buffer; and zeroing the contents of at least one contiguous free and non-zero section within the transfer buffer without accessing a host bus of the computer system.

8. The method of claim 7, wherein said detecting comprises detecting a processor executing an idle task.

9. The method of claim 7, further comprising:

said searching comprising searching from a beginning of the transfer buffer; and said zeroing comprising zeroing a first contiguous free and non-zero section within the transfer buffer from the beginning.

10. The method of claim 7, further comprising:

periodically repeating said detecting, searching and zeroing;

after each said zeroing, setting a pointer to indicate a location within the transfer buffer after the contiguous free and non-zero section that was zeroed; and said searching, comprising searching from the pointer previously set.

11. The method of claim 7, further comprising:

after each said zeroing, updating the index.

12. The method of claim 7, further comprising:

selecting one of a plurality of free and non-zero sections within the transfer buffer.

13. The method of claim 7, further comprising:

said selecting comprising selecting a free and non-zero section that would result in the largest contiguous free and zero section within the transfer buffer.

* * * * *